W. D. KYLE.
BRACKET.
APPLICATION FILED MAY 7, 1917.

1,250,597. Patented Dec. 18, 1917.

INVENTOR
William D. Kyle

Yoreell, Keeney & French.
ATTORNEYS

UNITED STATES PATENT OFFICE.

WILLIAM D. KYLE, OF MILWAUKEE, WISCONSIN.

BRACKET.

1,250,597.     Specification of Letters Patent.     Patented Dec. 18, 1917.

Application filed May 7, 1917. Serial No. 166,837.

*To all whom it may concern:*

Be it known that I, WILLIAM D. KYLE, a citizen of the United States, and resident of Milwaukee, in the county of Milwaukee and State of Wisconsin, have invented new and useful Improvements in Brackets, of which the following is a description, reference being had to the accompanying drawings, which are a part of this specification.

The invention relates to supporting brackets.

The invention is more particularly designed to provide a bracket for use with an insulator connected to the bracket by a bail so that the insulator may have a universal joint connection with the bracket.

The invention is further designed to provide a bracket for heavy duty which may be quickly attached, the bracket being provided with a single screw which may be screwed into the line pole, side of a house or other support on which it is desired to hang the insulator.

The invention is further designed to provide a bracket with a broad base portion to relieve the attaching screw of lateral strains.

The invention is further designed to provide a bracket with a squared portion on its base so that the bracket may be readily screwed into place with a wrench.

The invention further consists in the several features hereinafter set forth.

In general the bracket consists of a fastening portion, to which the article to be supported is connected, a body portion and an attaching portion.

Figure 1:
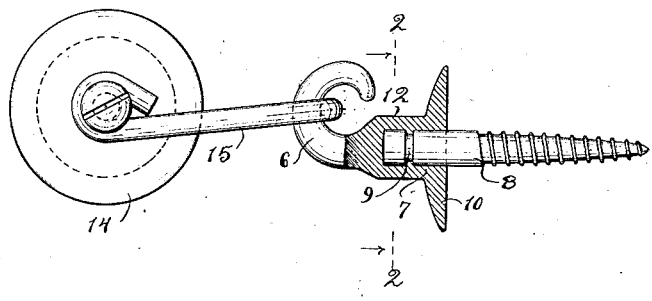
Figure 1 is a view of a device embodying the invention, parts being shown in section, the bracket being attached to a bail carrying an insulator.

In Fig. 1 the fastening portion 6 in the form of a hook, and the body portion 7 are integral and are formed by being cast about a steel lag screw 8, said screw being provided with a peripheral groove 9 into which a portion of the metal forming the bracket flows when the same is cast on the screw and being preferably disposed centrally of the base portion. The portions 6 and 7 are made of bendable metal so that the hooked portion 6 may be bent down to form a closed hook. The body of the bracket consists of a broad flat base 10 and a square-shaped portion 12, said base relieving the screw 8 of lateral strain when secured in a support, the shape of the portion 12 permitting the use of a wrench to screw the bracket into place.

Figure 3:
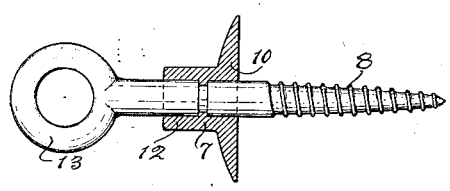
Fig. 3 is a vertical sectional view of a slightly different form of bracket from that shown in Fig. 1.
Figure 2:
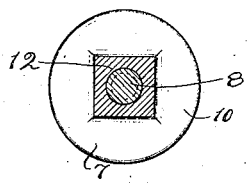
Fig. 2 is a section taken on the line 2—2 of Fig. 1.

In Fig. 3, the fastening portion 6 is shown as a closed hook or eye 13, and said fastening portion is formed integral with the steel screw 8, the body portion being cast on to the screw as before and consisting of the same parts as those previously described in connection with Fig. 1.

Figure 4:
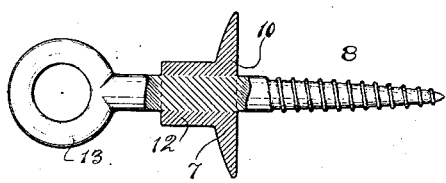
Fig. 4 is a view of a bracket similar to Fig. 3 showing a different means for uniting the parts together.

In Fig. 4, I have shown a construction similar to Fig. 3 except that the body portion is secured to the attaching screw by welding.

Figure 5:
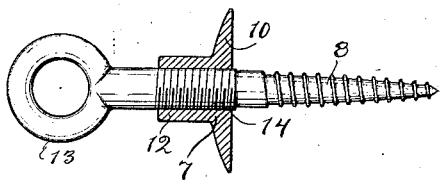
Fig. 5 is a view similar to Fig. 3 showing another way of uniting the parts together.

In Fig. 5, I have shown a construction similar to Fig. 3 except that the body portion is secured to the attaching screw by a threaded connection 14.

In all these constructions the insulator 14 is secured to the bracket by a bail 15 loosely mounted in the fastening end of the bracket.

In connection with these various forms it will be apparent that the fastening portion, body portion and attaching portion are rigidly secured together to form in effect a one-piece bracket.

With this construction of bracket it will be noted that the broad, flat base takes the strain off the screw on the side pull, and that the fastening portion is in line with the screw on the straight pull so that the tensional pull is resisted by the tensional strength of the bracket.

The bracket is simple and durable in construction and has decided advantages in its ready attachability over those constructions using a plurality of screws and requiring the use of a screw driver to put them in place as the present brackets may be put up at any place desired without much effort or danger to the lineman.

What I claim as my invention is:

A bracket comprising a fastening portion, a body portion having a broad base and a wrench-engaging portion, a steel screw having a part within said base portion and projecting outwardly therefrom, all of said parts being rigidly secured together.

In testimony whereof, I affix my signature.

WILLIAM D. KYLE.